US012775563B2

(12) United States Patent
Wells et al.

(10) Patent No.: US 12,775,563 B2
(45) Date of Patent: Oct. 27, 2026

(54) OPTIMIZING WRITE AMPLIFICATION FOR A MEMORY SUB-SYSTEM IN A VIRTUALIZED COMPUTING ENVIRONMENT

(71) Applicant: Micron Technology, Inc., Boise, ID (US)

(72) Inventors: Steven Wells, Sacramento, CA (US); Nathan Joel Freidig, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 18/974,642

(22) Filed: Dec. 9, 2024

(65) Prior Publication Data

US 2026/0161576 A1 Jun. 11, 2026

(51) Int. Cl.
*G06F 13/16* (2006.01)
*G06F 13/42* (2006.01)

(52) U.S. Cl.
CPC ...... *G06F 13/1668* (2013.01); *G06F 13/1642* (2013.01); *G06F 13/4221* (2013.01)

(58) Field of Classification Search
CPC ............. G06F 13/1668; G06F 13/1642; G06F 13/4221
See application file for complete search history.

(56) References Cited

U.S. PATENT DOCUMENTS

2010/0306445 A1* 12/2010 Dake ..................... G06F 3/0631 718/1
2011/0320690 A1* 12/2011 Petersen ............... G06F 3/0611 711/E12.019
2021/0019085 A1 1/2021 Zhu et al.
2023/0244462 A1 8/2023 Shah et al.
2024/0012579 A1 1/2024 Helmick et al.
2024/0256320 A1 8/2024 Dawkins et al.
2024/0354004 A1 10/2024 Helmick et al.

OTHER PUBLICATIONS

International Search Report and Written Opinion for International Application No. PCT/US2025/058489, mailed Apr. 10, 2026, 9 Pages.

* cited by examiner

*Primary Examiner* — Jae U Yu
(74) *Attorney, Agent, or Firm* — Lowenstein Sandler LLP

(57) ABSTRACT

A processing device in a memory sub-system presents a plurality of physical functions to a host system over a physical host interface, the host system to assign the plurality of physical functions to a plurality of tenants executed by the host system, associates a plurality of placement identifiers with the plurality of physical functions, and stores data received from the plurality of tenants in respective segments of a memory device, wherein the respective segments are identified using the plurality of placement identifiers.

18 Claims, 6 Drawing Sheets

OPTIMIZING WRITE AMPLIFICATION FOR A MEMORY SUB-SYSTEM IN A VIRTUALIZED COMPUTING ENVIRONMENT

TECHNICAL FIELD

Embodiments of the disclosure relate generally to memory sub-systems, and more specifically, relate to optimizing write amplification for a memory sub-system in a virtualized computing environment.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
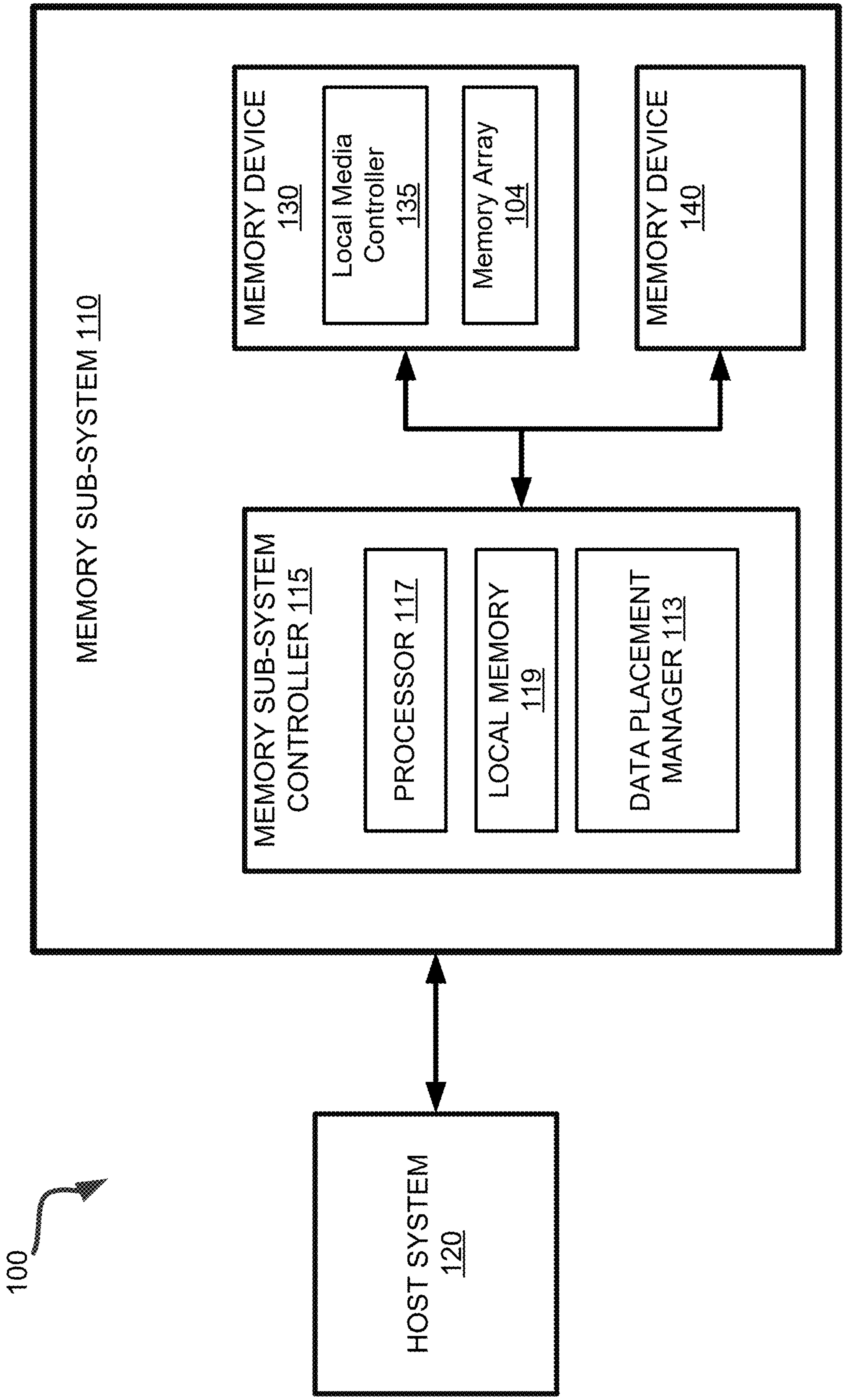
FIG. 1 illustrates an example computing system that includes a memory sub-system in accordance with some embodiments of the present disclosure.

Aspects of the present disclosure are directed to optimizing write amplification for a memory sub-system in a virtualized computing environment. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

One example of a memory sub-system is a solid-state drive (SSD) that includes one or more non-volatile memory devices and a memory sub-system controller to manage the non-volatile memory devices. The memory devices can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

A memory device in the memory sub-system can include memory cells arranged as one or more memory pages (also referred to herein as "pages") for storing one or more bits of binary data corresponding to data received from the host system. For example, an application executed by the host system (also referred to herein as a "host system application" or a tenant") can issue program commands to the memory sub-system to write the host data to the respective memory pages. One or more memory pages of the memory device can be grouped together to form a data block. When data is written to the memory device, it is typically done at the page level, such that an entire page, or multiple pages, is written in a single program operation. When the memory device is full, such that there is insufficient capacity to accept additional write operations, certain data can be erased in order to free up space. When data is erased from the memory device, however, it is typically done at the block level, such that an entire block (including multiple pages) is erased in a single operation. Thus, when a particular segment of data on the memory device is updated, for example, certain pages in a block will have data that has been re-written to a different page and/or is no longer needed. For example, if the host system has multiple tenants all writing data to the memory sub-system, the data from the multiple tenants may be co-mingled in different pages of a given block. When one tenant no longer needs its data, the memory sub-system may wish to erase the pages storing the data written by that tenant. The entire block cannot simply be erased, however, as the block likely also has some number of pages of valid data, such as those pages storing data belonging to other tenants.

That memory sub-system can perform a garbage collection process, which involves moving those pages of the block that contain valid data to another block, so that the current block can be erased and rewritten. Garbage collection is a form of automatic memory management that attempts to reclaim garbage, or memory occupied by stale data objects that are no longer in use (e.g., because they have been updated with new values or are no longer needed by their tenant). The basic principle of garbage collection is to find data objects that cannot or need not be accessed in the future, and to reclaim the resources (i.e. storage space) used by those objects. The additional writes that result from moving data from one block to another during the garbage collection process create a phenomenon referred to as write amplification. This is generally undesirable as the individual segments, data units, or blocks of the memory component can be written, read, and/or erased only a finite number of times before physical wear causes the memory component to fail. In addition, garbage collection utilizes memory sub-system bandwidth, possibly adding latency to host-initiated read or write operations and increasing the power utilization in the memory sub-system.

Certain memory sub-systems attempt to reduce the negative effects of write amplification by implementing a flexible data placement (FDP) scheme. The flexible data placement scheme allows data from a given tenant to be referenced by a unique placement identifier (also referred to herein as a "handle") which in turn points to a particular segment of the memory device (also referred to herein as a reclaim unit (RU)). A reclaim unit is a segment of physical, non-volatile storage that can be programmed, read, erased, reused, and/or repurposed without disturbing other segments of the memory device. For example, a given tenant can provide a corresponding handle along with data to be written to the memory device, and the memory sub-system can identify the associated reclaim unit and store the host data at that location. In this manner, the data associated with different tenants is separated into different reclaim units in the memory device. Accordingly, garbage collection is simplified as an entire reclaim unit can be erased and reclaimed without impacting the data associated with other host system tenants. This reduces write amplification and improves performance in the memory sub-system. Other memory sub-systems may utilize different approaches to reduce write amplifications, such as a zone namespace (ZNS) scheme, which similarly group data from the same tenants into respective physical locations.

Flexible data placement, however, is limited in the number of reclaim units and corresponding handles that can be utilized. For example, a conventional flexible data placement scheme may utilize eight (8) reclaim units, thereby limiting the number of host tenants that can utilize the memory device. In addition, the host tenants must be properly configured to utilize flexible data placement, such as to provide the corresponding handle along with each write request made to the memory sub-system. Certain computing environments, such as virtualized computing environments utilizing multiple physical functions, can support significantly more tenant devices that can utilize flexible data placement. For example, certain memory sub-systems may provide up to 64 physical functions visible to the host system. The physical functions allow a memory sub-system connected to a peripheral component interconnect (PCI) Express (PCIe) bus that would normally appear as a single PCIe device to present itself as multiple separately addressable PCIe devices. The use of virtual non-volatile memory express (NVMe) controllers, each having a corresponding physical function, allows different tenants (e.g., virtual machines) in a host system to share a single PCIe interface with the memory sub-system. The host system sees each physical function as a separate physical storage device which can be assigned to a different tenant allowing a single underlying storage resource to be shared by multiple entities on the host system. Since the number of physical functions in the memory sub-system is greater than number of reclaim units supported by the memory sub-system, the implementation of a flexible data placement scheme is complicated.

Aspects of the present disclosure address the above and other deficiencies by optimizing write amplification for a memory sub-system in a virtualized computing environment. In one embodiment, processing logic in the memory sub-system controller assigns handles to the physical functions presented to the host system. Once all of the handles are assigned to different physical functions, the processing logic can utilize an arbitration scheme to further assign existing individual handles to any additional physical functions. Each handle is associated with an underlying reclaim unit and so the arbitration scheme can be defined to balance the load among the multiple associated physical functions (e.g., using a round robin approach, a least assigned approach, etc.). As host tenants are associated with respective physical functions, the tenants do not require specific configuration for the flexible data placement scheme utilized in the memory sub-system, since the tenants are merely assigned to a given physical function to which they will issue memory access requests/commands. As physical functions are deleted or otherwise unaffiliated with tenants, the corresponding handle can be unassigned, thereby allowing the handle to be reassigned to another physical function.

Advantages of the approach described herein include, but are not limited to, improved performance in the memory sub-system. These write optimization techniques permit flexible data placement, zone namespace, or other placement standards to be utilized in a virtualized computing environment supporting multiple tenants, such as multi-physical function NVMe device (MFND) or single root input/output virtualization (SR-IOV). Such systems can experience reduced write amplification, which leads to increased endurance of the physical storage media, improved power efficiency, and reduced latency for processing host-initiated memory access commands. The approach described herein remains fully transparent to the host system and does not require specific knowledge or configuration of the host system to be implemented.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the physical host interface (e.g., PCIe or CXL bus). The physical host interface provides an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, memory sub-system 110 includes data placement manager 113. In some embodiments, the memory sub-system controller 115 includes at least a portion of the data placement manager 113. In some embodiments, the data placement manager 113 is part of the host system 120, an application, or an operating system. In other embodiments, local media controller 135 includes at least a portion of data placement manager 113 and is configured to perform the functionality described herein. Data placement manager 113 can control the assignment of placement identifiers (i.e., "handles") to entities in the memory sub-system 110, such a physical functions presented by the memory sub-system 110 to the host system 120. As described herein the handles correspond to respective segments (i.e., "reclaim units") of the memory device 130, such that the data placement manager 113 can program data received from an entity assigned a given handle to a corresponding reclaim unit. Data placement manager 113 can further perform load balancing to manage the number of entities assigned to different handles in order to minimize write amplification resulting from garbage collection in the reclaim units of the memory device 130. Further details with regard to the operations of data placement manager 113 are described below.

Figure 2:
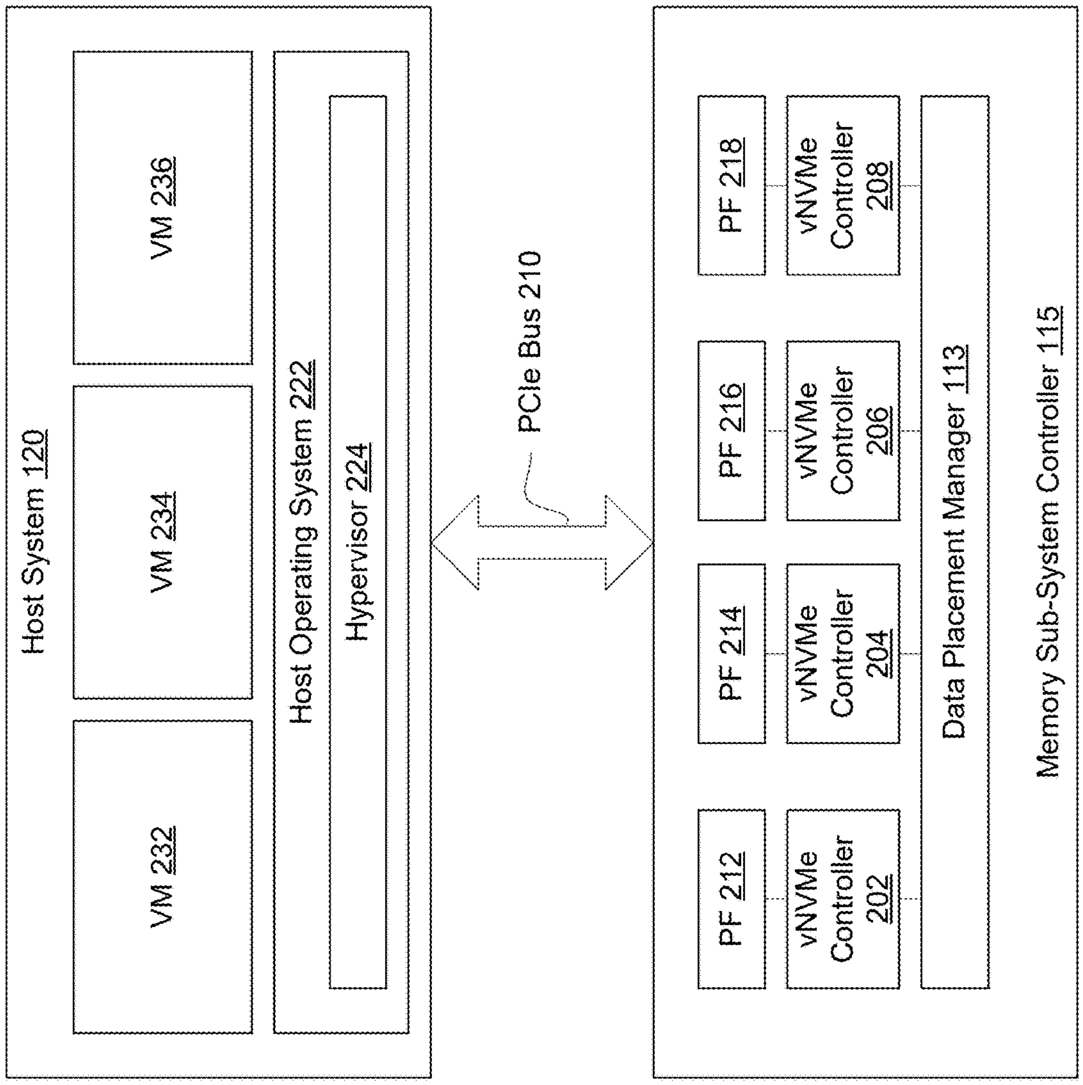
FIG. 2 is a block diagram illustrating an example physical host interface between a host system and a memory sub-system in accordance with some embodiments of the present disclosure.

FIG. 2 is a block diagram illustrating an example physical host interface between a host system and a memory sub-system in accordance with some embodiments of the present disclosure. In one embodiment, the memory sub-system controller 115 of memory sub-system 110 is connected to host system 120 over a physical host interface, such as PCIe bus 210, or a CXL interface, for example. In one embodiment, memory sub-system controller 115 generates and manages a number of virtual NVMe controllers 202-208 within memory sub-system controller 115. The virtual NVMe controllers 202-208 are virtual entities that appear as physical controllers to other devices, such as host system 120, connected to PCIe bus 210 by virtue of a physical function 212-218 associated with each virtual NVMe controller 202-208. The embodiment illustrated in FIG. 2 includes four virtual NVMe controllers 202-208 and four corresponding physical functions 212-218. In other embodiments, however, there may be any other number of NVMe controllers, each having a corresponding physical function, such as up to 64 NVMe controllers and physical functions, for example. In addition, although a multi-physical function NVMe device (MFND) is illustrated in FIG. 2, it should be understood that, in other embodiments, the flexible data placement standards described herein can be utilized in other computing environments supporting multiple tenants, such as environments implementing single root input/output virtualization (SR-IOV), among others.]

Each of virtual NVMe controllers 202-208 manages memory access operations for the corresponding segment (i.e., reclaim unit) of the underlying memory device 130, with which it is associated. For example, virtual NVMe controller 202 may receive data access requests from host system 120 over PCIe bus 210, including requests to read, write, or erase data in a first segment of memory device 130. In response to the request, virtual NVMe controller 202 may perform the requested memory access operation on the data stored at an identified address in the first segment and return requested data and/or a confirmation or error message to the host system 120, as appropriate. Virtual NVMe controllers 204-208 may function in the same or similar fashion with respect to data access requests for their own corresponding segments of memory device 130.

In some embodiments, the memory sub-system controller 115 associates one of physical functions 212-218 with each of virtual NVMe controllers 202-208 in order to allow each virtual NVMe controller 202-208 to appear as a physical controller on PCIe bus 210. For example, physical function 212 may correspond to virtual NVMe controller 202, physical function 214 may correspond to virtual NVMe controller 204, physical function 216 may correspond to virtual NVMe controller 206, and physical function 218 may correspond to virtual NVMe controller 208. Physical functions 212-218 are fully featured PCIe functions that can be discovered, managed, and manipulated like any other PCIe device, and thus can be used to configure and control a PCIe device (e.g., virtual NVMe controllers 202-208). Each physical function 212-218 can have some number virtual functions associated with therewith. The virtual functions are lightweight PCIe functions that share one or more resources with the physical function and with virtual functions that are associated with that physical function. Each virtual function has a PCI memory space, which is used to map its register set. The virtual function device drivers operate on the register set to enable its functionality and the virtual function appears as an actual PCIe device, accessible by host system 120 over PCIe bus 210.

In some embodiments, each physical function 212-218 can be assigned to any one of multiple tenants on host system 120. For example, the tenants can include virtual machines 232-236 in the host system 120. When I/O data is received at a virtual NVMe controller 202-208 from a virtual machine 232-236, a virtual machine driver provides a guest physical address for a corresponding read/write command. The memory sub-system controller 115 translates the physical function number to a bus, device, and function (BDF) number and then adds the command to a direct memory access (DMA) operation to perform the DMA operation on the guest physical address. In one embodiment, memory sub-system controller 115 further transforms the guest physical address to a system physical address for the memory sub-system 110.

Furthermore, each physical function 212-218 may be implemented in either a privileged mode or normal mode. When implemented in the privileged mode, the physical function has a single point of management that can control resource manipulation and storage provisioning for other functions implemented in the normal mode. In addition, a physical function in the privileged mode can perform management options, including for example, enabling/disabling of multiple physical functions, storage and quality of service (QoS) provisioning, firmware and controller updates, vendor unique statistics and events, diagnostics, secure erase/encryption, among others. Typically, a first physical function can implement a privileged mode and the remainder of the physical functions can implement a normal mode. In other embodiments, however, any of the physical functions can be configured to operate in the privileged mode. Accordingly, there can be one or more functions that run in the privileged mode.

Host system 120 runs multiple virtual machines 232, 234, 236, by executing a software layer 224, often referred to as "hypervisor," above the hardware and below the virtual machines, as schematically shown in FIG. 2. In one illustrative example, the hypervisor 224 may be a component of a host operating system 222 executed by the host system 120. Alternatively, the hypervisor 224 may be provided by an application running under the host operating system 222, or may run directly on the host system 120 without an operating system beneath it. The hypervisor 224 may abstract the physical layer, including processors, memory, and I/O devices, and present this abstraction to virtual machines 232, 234, 236 as virtual devices, including virtual processors, virtual memory, and virtual I/O devices. Virtual machines 232, 234, 236 may each execute a guest operating system which may utilize the underlying virtual devices, which may, for example, map to a portion of the memory device 130 managed by one of virtual NVMe controllers 202-208 in memory sub-system 110. One or more applications may be running on each virtual machine under the guest operating system.

Each virtual machine 232, 234, 236 may include one or more virtual processors. Processor virtualization may be implemented by the hypervisor 224 scheduling time slots on one or more physical processors such that from the guest operating system's perspective, those time slots are scheduled on a virtual processor. Memory virtualization may be implemented by a page table (PT) which is a memory structure translating guest memory addresses to physical memory addresses. The hypervisor 224 may run at a higher privilege level than the guest operating systems, and the latter may run at a higher privilege level than the guest applications.

In one implementation, there may be multiple partitions on host system 120 representing virtual machines 232, 234, 236. A parent partition corresponding to virtual machine 232 is the root partition (i.e., root ring 0) that has additional privileges to control the life cycle of other child partitions (i.e., conventional ring 0), corresponding, for example, to virtual machines 234 and 236. Each partition has corresponding virtual memory, and instead of presenting a virtual device, the child partitions see a physical device being assigned to them. When host system 120 initially boots up, the parent partition can see all of the physical devices directly. The pass through mechanism (e.g., PCIe Pass-Through or Direct Device Assignment) allows the parent partition to assign an NVMe device (e.g., one of virtual NVMe controllers 202-208) to the child partitions. The associated virtual NVMe controllers 202-208 may appear as a virtual storage resource to each of virtual machines 232, 234, 236, which the guest operating system or guest applications running therein can access. In one embodiment, for example, virtual machine 232 is associated with virtual NVMe controller 202, virtual machine 234 is associated with virtual NVMe controller 204, and virtual machine 236 is associated with virtual NVMe controller 206. In other embodiments, one virtual machine may be associated with two or more virtual NVMe controllers.

In some embodiments, data placement manager 113 controls the assignment of placement identifiers (i.e., "handles") to the physical functions 212-218 in the memory sub-system controller 115. As described herein, the handles correspond to respective segments (i.e., "reclaim units") of the memory device 130 and there may be more physical functions in the memory sub-system controller 115 than there are handles/reclaim units. Accordingly, data placement manager 113 can perform operations, such as assigning a handle to any newly created physical functions (e.g., using round robin or another approach to minimize the number of physical functions associated with each handle), unassigning handles from any physical functions that are deleted or no longer in use, and optionally performing load balancing to equalize the number of physical functions associated with each handle.

Figure 3:
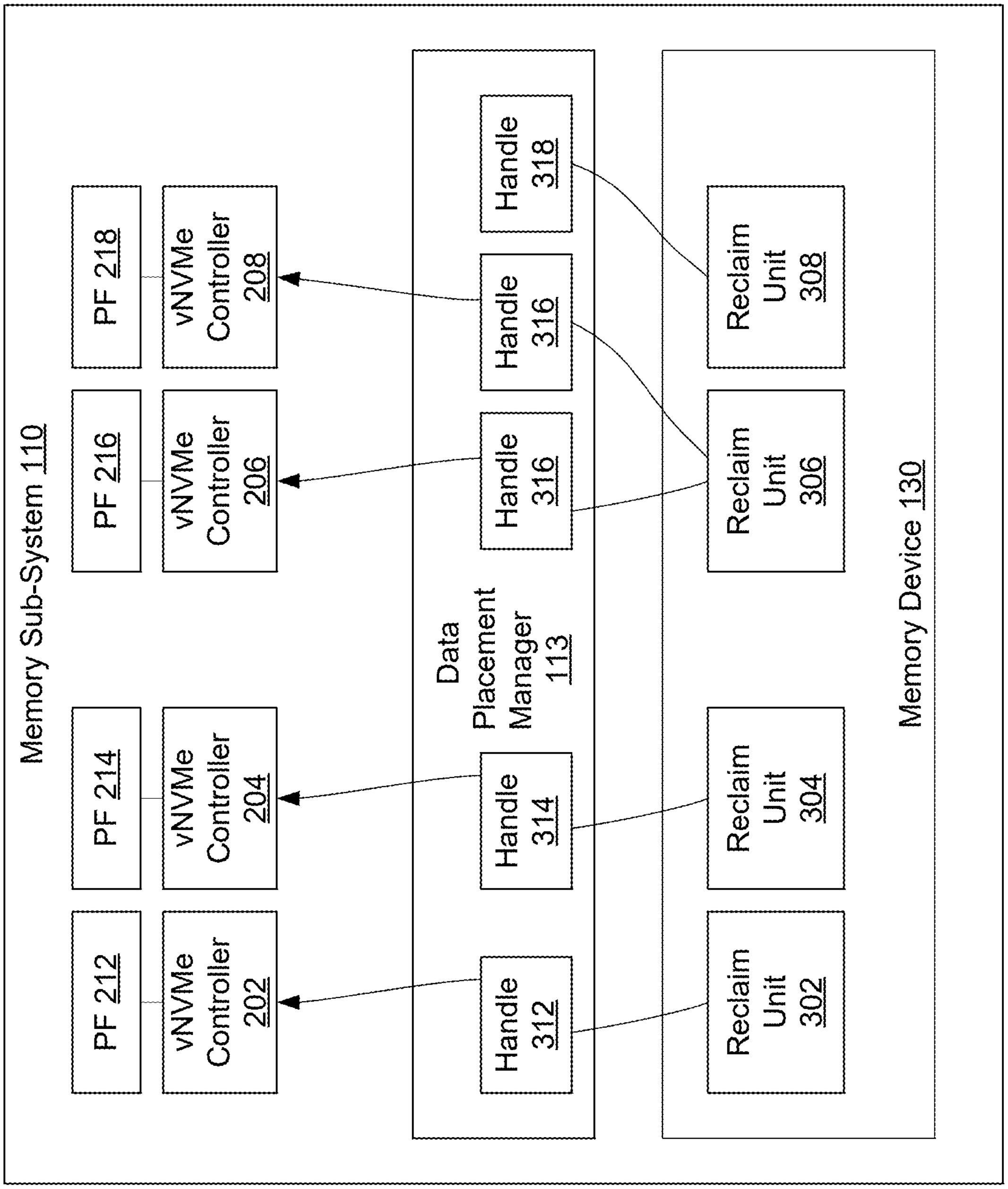
FIG. 3 is a block diagram illustrating the mapping of reclaim units to physical functions in a memory sub-system in accordance with some embodiments of the present disclosure.

FIG. 3 is a block diagram illustrating the mapping of reclaim units to physical functions in a memory sub-system in accordance with some embodiments of the present disclosure. As described above, the memory sub-system controller 115 maps each NVMe controller and physical function in the memory sub-system 110 to a corresponding segment (i.e., reclaim unit) of memory device 130. As illustrated in FIG. 3, virtual NVMe controller 202 and physical function 212 are mapped to reclaim unit 302, virtual NVMe controller 204 and physical function 214 are mapped to reclaim unit 304, virtual NVMe controller 206 and physical function 216 are mapped to reclaim unit 306, and virtual NVMe controller 208 and physical function 218 are also mapped to reclaim unit 306. There are not currently any virtual NVMe controllers or physical functions mapped to reclaim unit 308. Each reclaim unit 302-308 may have a fixed size or may have a different size. For example, segment 302 could be larger than segment 304, which may be larger than segment 306, which may be the same size as segment 308. In one embodiment, each segment 302-308 is represented by a unique namespace. The namespace is portion of one or more memory devices that can be formatted into logical blocks when the memory devices are configured with the NVMe protocol. The NVMe protocol provides access to the namespace, which appears as a standard-block device on which file systems and applications can be deployed without any modification. Each virtual NVMe controller 202-208 may have one or more separate namespaces, each identified by a unique namespace ID (NSID). In addition, there may be one or more shared namespaces, comprising multiple segments 302-308 that are accessible by two or more of virtual NVMe controllers 202-208.

In some embodiments, data placement manager 113 assigns placement identifiers (e.g., handles 312-318) to the physical functions 212-218 in the memory sub-system controller 115. These handles correspond to respective segments (i.e., "reclaim units") of the memory device 130. For example, handle 312 corresponds to reclaim unit 302, handle 314 corresponds to reclaim unit 304, handle 316 corresponds to reclaim unit 306, and handle 318 corresponds to reclaim unit 308. As new physical functions are created, instantiated, activated, assigned tenants, etc., data placement manager 113 can assign one of handles 312-318 to the physical functions. In one embodiment, a different handle, and by default a different corresponding reclaim unit, is assigned to each physical function until all idle handles are assigned. Thus, if there are remaining handles that have not been assigned to a physical function, data placement manager 113 can assign one of those handles to a new physical function. For example, as illustrated in FIG. 3, handle 312 is assigned to physical function 212 and handle 314 is assigned to physical function 214. However, once the number of physical functions in the memory sub-system controller 115 exceeds the number of handles/reclaim units, data placement manager 113 may select an already assigned handle to be assigned to any additional physical functions. For example, as illustrated in FIG. 3, handle 316 is assigned to both physical function 216 and physical function 218. Depending on the embodiment, data placement manager 113 can use a round robin approach, can select the handle having the least number of assigned physical functions, or can use some other approach to select the already assigned handle. Over time, as physical functions are deleted, deactivated unassociated with a host tenant, etc., data placement manager 113 can unassign a given handle/reclaim unit. For example, as illustrated in FIG. 3, handle 318 is not currently assigned to any physical function and thus remains available to be reassigned to any new physical function.

Figure 4:
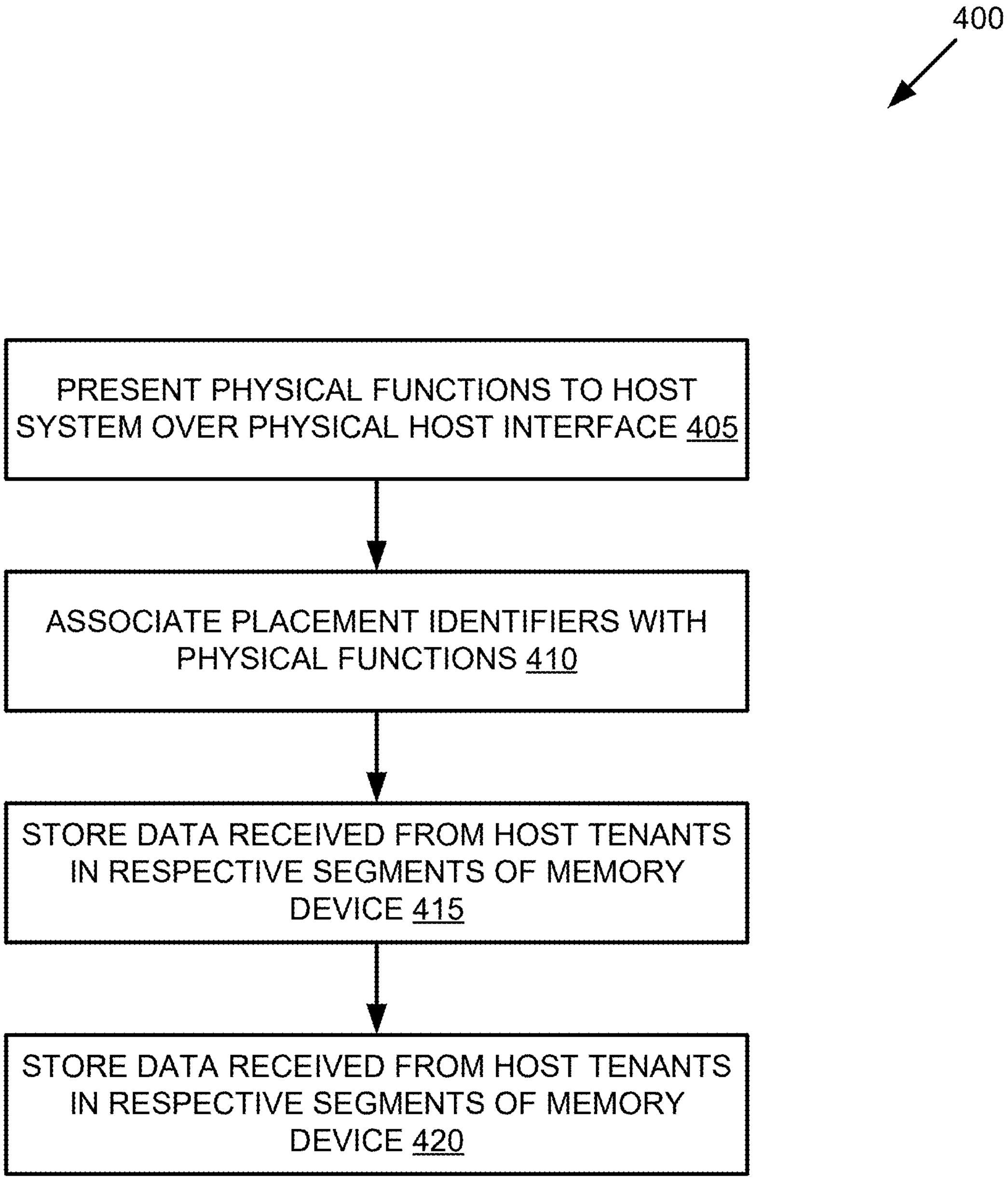
FIG. 4 is a flow diagram of an example method of optimizing write amplification for a memory sub-system in a virtualized computing environment in accordance with some embodiments of the present disclosure.

FIG. 4 is a flow diagram of an example method of optimizing write amplification for a memory sub-system in a virtualized computing environment in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by data placement manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic (e.g., data placement manager 113 executed by memory sub-system controller 115) presents a plurality of physical functions 212-218 to a host system, such as host system 120, over a physical host interface. In some embodiments, the physical host interface comprises at least one of a peripheral component interconnect express (PCIe) interface or a compute express link (CXL) interface. In other embodiments, however, some other interface may be used. In some embodiments, each of the plurality of physical functions 212-218 has a corresponding one of a plurality of virtual memory controllers, such as virtual NVMe controllers 202-208. Each of the plurality of physical functions 212-218 is to represent a corresponding one of the plurality of virtual memory controllers 202-208 as a physical memory controller to the host system 120 on the physical host interface. The host system 120 may assign the plurality of physical functions 212-218 to a plurality of tenants executed by the virtual machine. For example, the tenants can include virtual machines, such as virtual machines 232, 234, 236, running on the host system 120, and each tenant can be assigned to a different physical function. Each of the plurality of physical functions 212-218 provides a configuration space for a corresponding one of the plurality of virtual memory controllers, wherein each configuration space is addressable by knowing a unique bus, device, and function (BDF) number. In addition, a first physical function, such as physical function 212, of the plurality of physical functions 212-218 may be implemented in a privileged mode and be configured to perform management operations on a remainder of the plurality of physical functions (e.g., physical functions 214-218), which may be implemented in a normal mode.

At operation 410, the processing logic associates a plurality of placement identifiers, such as handles 312-318 with the plurality of physical functions. In some embodiments, the placement identifiers comprise reclaim unit handles (RUHs) that each uniquely identify a corresponding segment of the memory device 130, such as one of reclaim units 302-308. For example, each placement identifier can include a memory pointer identifying a physical location in memory device 130 where the corresponding segment begins or is located. In other embodiments, any type of identifier, such as handles, tags, etc. can be used to replace the reclaim unit handles. In some embodiments, data placement manager 113 can store the assignment of the placement identifiers in a data structure. The data structure can also include a mapping of each reclaim unit or a range of reclaim units to a particular placement identifier. In some implementations, the data structure include one or more entries, including a placement identifier, a set of one or more reclaim units (e.g., identified by physical addresses), a reclaim group (e.g., a grouping of multiple reclaim units), a reclaim unit granularity (e.g., represented by a size), and/or a size of the reclaim unit. Thus, each placement identifier can be used to identify a corresponding segment and a namespace to which it is assigned. The reclaim unit granularity can identify a size of one reclaim unit. In some embodiments, each namespace can have a reclaim unit granularity with a differing size than another namespace. In some embodiments, each namespace can have a reclaim unit granularity with the same size as another namespace or each namespace.

In some embodiments, a number of physical functions in the memory sub-system 110 is greater than a number of placement identifiers and respective segments of the memory device 130. For example, a given device 130 may include eight (8) placement identifiers and corresponding segments (e.g., reclaim units), while the memory sub-system controller 115 provides up to sixty-four (64) physical functions. Accordingly, in order to fully map each of the physical functions, one or more of the plurality of placement identifiers can associated with multiple (e.g., two or more) of the plurality of physical functions. In one embodiment, as physical functions are created, instantiated, activated, etc., data placement manager 113 can assign a currently unassigned placement identifier (e.g., one of handles 312-318). Once all of the placement identifiers have been assigned, and a new physical function is identified, data placement manager 113 can apply an arbitration scheme to assign one of the placement identifiers. Depending on the embodiment, the arbitration scheme can include at least one of round robin, least assigned, or some other approach. For example, with round robin, data placement manager 113 may cycle through each placement identifier, assigning them in order, before looping back to the first placement identifier and repeating the process. Conversely, with the least assigned approach, data placement manager 113 may track the number of physical functions to which each of the placement identifiers is currently assigned, and when a new assignment is needed, identify and assign the placement identifier currently assigned to the least number of physical functions. In other embodiments, the arbitration scheme can be based on a different methodology, such as assigning placement identifiers based on system telemetry of current handle utilization (e.g., time and/or memory usage) for load balancing or optimizing write amplification, for example.

At operation 415, the processing logic stores data received from the plurality of tenants in respective segments of the memory device 130. As noted above, the respective segments can be identified using the plurality of placement identifiers associated with the physical functions. For example, when a memory access request is received from a host tenant, such as one of virtual machines 232, 234, 236, at a given physical function having an associated placement identifier, data placement manager 113 can identify a corresponding segment in memory device 130, such as one of reclaim units 302-308 based on the placement identifier, such as one of handles 312-318. Data placement manager 113 can then perform either a program, read, or erase operation on the identified segment based on the nature of the received memory access request. In this manner, the data belonging to different host tenants remains physically segregated in the different segments of the memory device 130, such that garbage collection efficiency can be improved and resulting write amplification reduced in the memory sub-system 110.

At operation 420, the processing logic periodically (e.g., based on polling or interrupt driven) reassigns the plurality of placement identifiers among the plurality of physical functions to balance a number of physical functions associated with each of the plurality of placement identifiers. Over time, as physical functions are created and deleted and as the corresponding placement identifiers are assigned and unassigned to the physical functions, the number of physical functions to which the different placement identifiers are assigned may become unbalanced. For example, as illustrated in FIG. 3, handles 312 and 314 are each assigned to one physical function, handle 316 is assigned to two physical functions, and handle 318 is not assigned to any physical functions. This may result in sub-optimal performance in the memory sub-system. Accordingly, data placement manager 113 may perform operations to re-balance the assignments. The load balancing can be done using hardware or software, depending on the implementation, and can seek to make the number of number of physical functions to which each of the placement identifiers are assigned be equal or as close as possible. In some embodiments, certain placement identifiers may be weighted such that they can be assigned to more physical functions than other placement identifiers, and data placement manager 113 can factor in that weighting when performing the load balancing.

Figure 5A:
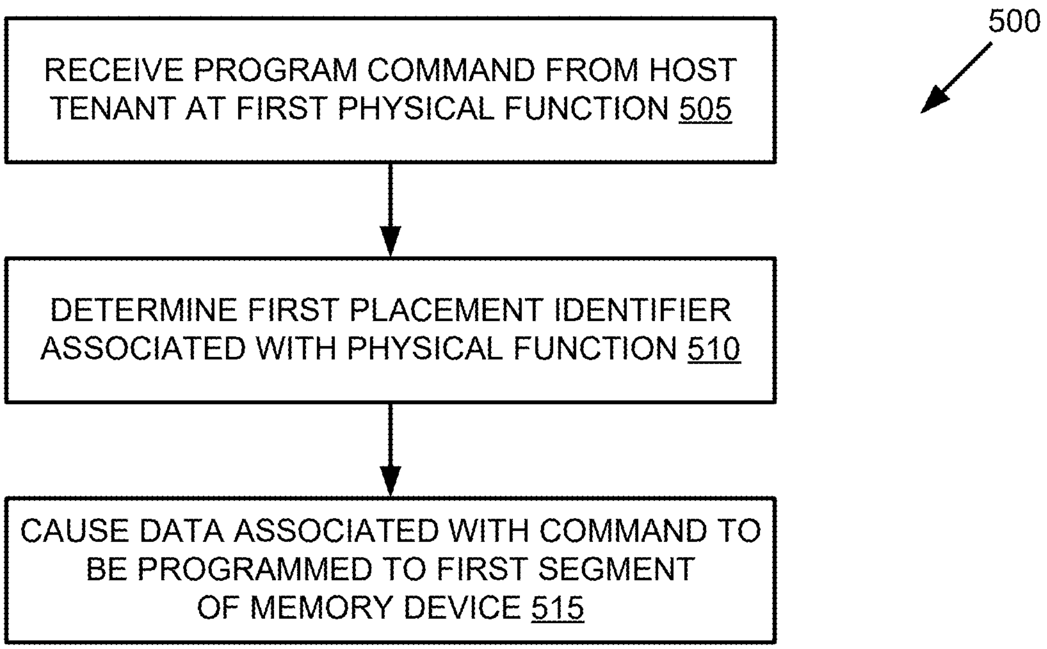
FIG. 5A and FIG. 5B are flow diagrams of example methods of processing memory access requests in a virtualized computing environment in accordance with some embodiments of the present disclosure.
Figure 5B:
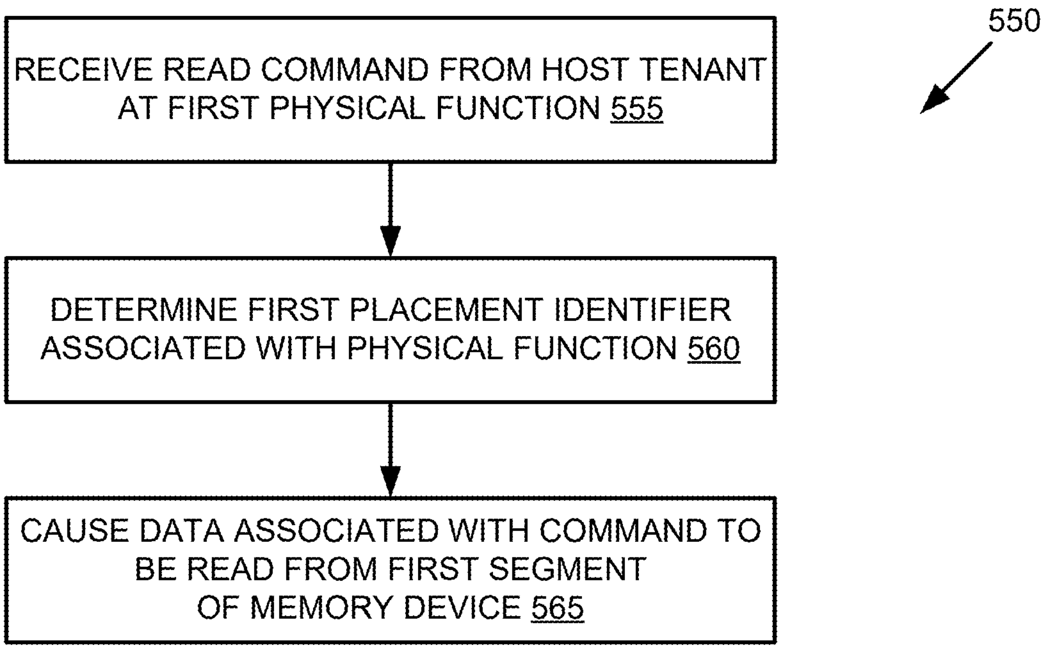

FIG. 5A and FIG. 5B are flow diagrams of example methods of processing memory access requests in a virtualized computing environment in accordance with some embodiments of the present disclosure. The methods 500 and 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 500 and 550 are performed by data placement manager 113 of FIG. 1. FIG. 5A illustrates the processing of a program command, while FIG. 5B illustrates the processing of a read command. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 5A, at operation 505, the processing logic (e.g., data placement manager 113 executed by memory sub-system controller 115) receives a program command from a first tenant of the plurality of tenants executed by the host system at a first physical function of the plurality of physical functions. As the tenant, such as virtual machine 232 for example, is already associated with one of the physical functions, such as physical function 212, the program command can be received from the virtual machine 232 by physical function 212 and can include data to be programmed to the memory device 130. Referring to FIG. 5B, at operation 555, the processing logic may instead receive a read command from the first tenant at the first physical function, where the read command includes the logical address of data to be read from the memory device 130.

Subsequently, at either operation 510 or operation 560, the processing logic determines a first placement identifier associated with the first physical function. As described above, each physical function can be associated with one of the plurality of placement identifiers, such as handles 312-318. For example, the physical function 212 may be associated with handle 312. Data placement manager 113 can consult a mapping table, data store, or other repository which stores indications of the mappings of placement identifiers and physical functions in order to determine the first placement identifier associated with the first physical function.

Referring again to FIG. 5A, at operation 515, the processing logic causes data associated with the program command to be programmed to a first segment of the memory device, wherein the first segment is identified by the first placement identifier. As described above, the first placement identifier has a corresponding segment of the memory device. For example, handle 312 may be associated with reclaim unit 302. Accordingly, data placement manager 113 may initiate a program operation to program the data received at operation 505 to reclaim unit 302, such as by sending instructions to local media controller 135 which controls memory access operations on memory device 130. Referring to FIG. 5B, at operation 565 the processing logic may instead initiate a read operation to read the requested data from reclaim unit 302 on memory device 130.

Figure 6:
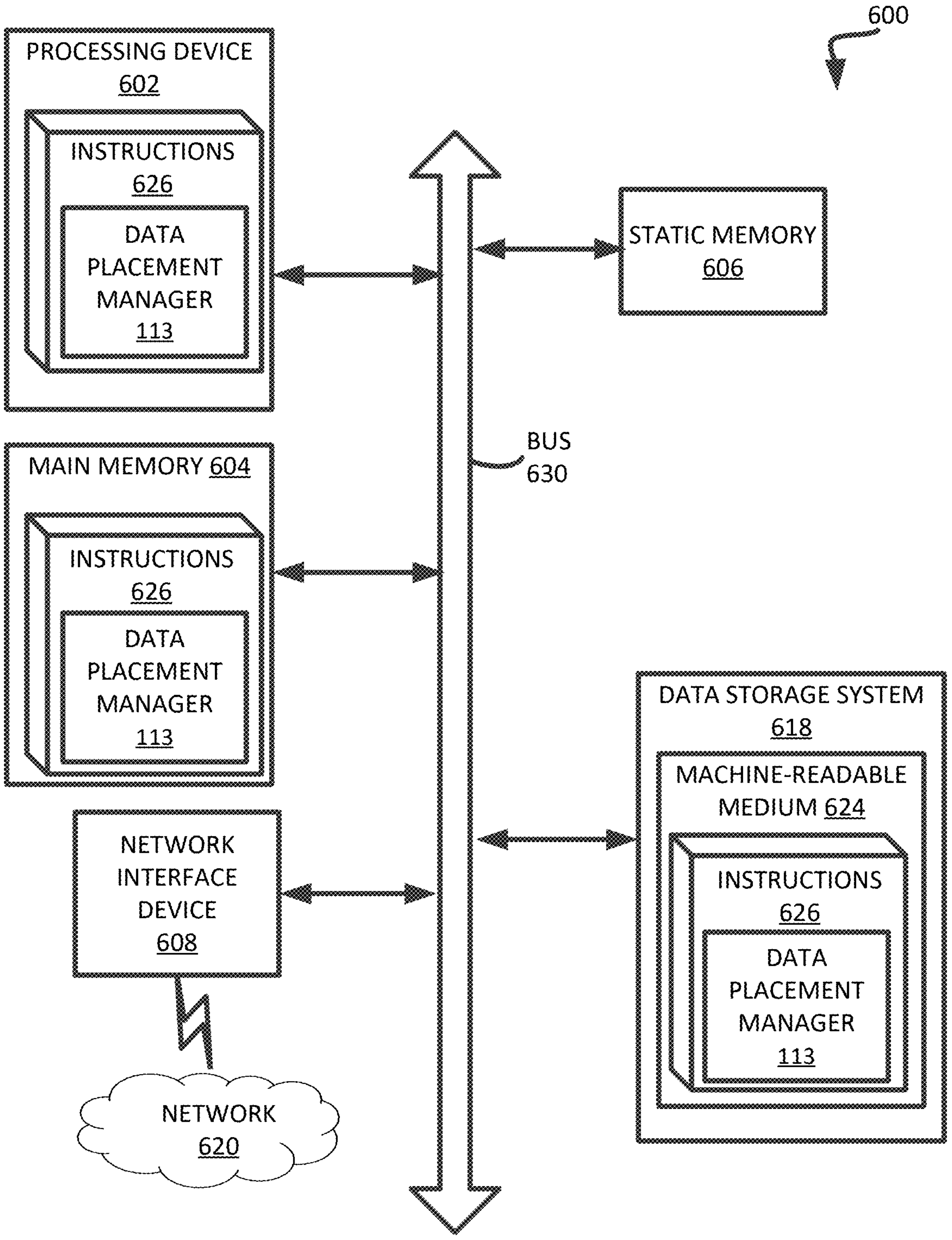
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1 and configured to perform operations corresponding to data placement manager 113) that includes, is coupled to, or utilizes a memory sub-system (e.g., the memory sub-system 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the data placement manager 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

presenting a plurality of physical functions to a host system over a physical host interface, wherein each of the plurality of physical functions has a corresponding virtual NVMe controller, and wherein each of the plurality of physical functions represents the corresponding virtual NVMe controller as a physical memory controller to the host system on the physical host interface, the host system to assign the plurality of physical functions to a plurality of tenants executed by the host system;

associating a plurality of placement identifiers with the plurality of physical functions; and storing data received from the plurality of tenants in respective reclaim units of the memory device, wherein the respective reclaim units are identified using the plurality of placement identifiers, and wherein data from different tenants is segregated into different reclaim units based on the placement identifiers associated with the respective physical functions.

2. The system of claim 1, wherein the plurality of tenants executed by the host system comprises a plurality of virtual machines.

3. The system of claim 1, wherein the physical host interface comprises at least one of a peripheral component interconnect express (PCIe) interface or a computer express link (CXL) interface.

4. The system of claim 1, wherein a number of physical functions in the system is greater than a number of placement identifiers and respective reclaim units of the memory device.

5. The system of claim 1, wherein at least one of the plurality of placement identifiers is associated with two or more of the plurality of physical functions.

6. The system of claim 1, wherein associating the plurality of placement identifiers with the plurality of physical functions comprises applying an arbitration scheme, the arbitration scheme comprising at least one of round robin or least assigned.

7. The system of claim 1, wherein the processing device is to perform operations further comprising:

receiving a program command from a first tenant of the plurality of tenants executed by the host system at a first physical function of the plurality of physical functions;

determining a first placement identifier associated with the first physical function; and causing data associated with the program command to be programmed to a first reclaim unit of the memory device, wherein the first reclaim unit is identified by the first placement identifier.

8. The system of claim 1, wherein the processing device is to perform operations further comprising:

periodically reassigning the plurality of placement identifiers among the plurality of physical functions to balance a number of physical functions associated with each of the plurality of placement identifiers.

9. A method comprising:

presenting a plurality of physical functions to a host system over a physical host interface, wherein each of the plurality of physical functions has a corresponding virtual NVMe controller, and wherein each of the plurality of physical functions represents the corresponding virtual NVMe controller as a physical memory controller to the host system on the physical host interface, the host system to assign the plurality of physical functions to a plurality of tenants executed by the host system;

associating a plurality of placement identifiers with the plurality of physical functions; and storing data received from the plurality of tenants in respective reclaim units of a memory device, wherein the respective reclaim units are identified using the plurality of placement identifiers, and wherein data from different tenants is segregated into different reclaim units based on the placement identifiers associated with the respective physical functions.

10. The method of claim 9, wherein a number of physical functions in the system is greater than a number of placement identifiers and respective reclaim units of the memory device, and wherein at least one of the plurality of placement identifiers is associated with two or more of the plurality of physical functions.

11. The method of claim 9, wherein associating the plurality of placement identifiers with the plurality of physical functions comprises applying an arbitration scheme, the arbitration scheme comprising at least one of round robin or least assigned.

12. The method of claim 9, further comprising:

receiving a program command from a first tenant of the plurality of tenants executed by the host system at a first physical function of the plurality of physical functions;

determining a first placement identifier associated with the first physical function; and causing data associated with the program command to be programmed to a first reclaim unit of the memory device, wherein the first reclaim unit is identified by the first placement identifier.

13. The method of claim 9, further comprising:

periodically reassigning the plurality of placement identifiers among the plurality of physical functions to balance a number of physical functions associated with each of the plurality of placement identifiers.

14. A non-transitory computer-readable storage medium comprising instructions that, when executed by a processing device, cause the processing device to perform operations comprising:

presenting a plurality of physical functions to a host system over a physical host interface, wherein each of the plurality of physical functions has a corresponding virtual NVMe controller, and wherein each of the plurality of physical functions represents the corresponding virtual NVMe controller as a physical memory controller to the host system on the physical host interface, the host system to assign the plurality of physical functions to a plurality of tenants executed by the host system;

associating a plurality of placement identifiers with the plurality of physical functions; and storing data received from the plurality of tenants in respective reclaim units of a memory device, wherein the respective reclaim units are identified using the plurality of placement identifiers, and wherein data from different tenants is segregated into different reclaim units based on the placement identifiers associated with the respective physical functions.

15. The non-transitory computer-readable storage medium of claim 14, wherein a number of physical functions in the system is greater than a number of placement identifiers and respective reclaim units of the memory device, and wherein at least one of the plurality of placement identifiers is associated with two or more of the plurality of physical functions.

16. The non-transitory computer-readable storage medium of claim 14, wherein associating the plurality of placement identifiers with the plurality of physical functions comprises applying an arbitration scheme, the arbitration scheme comprising at least one of round robin or least assigned.

17. The non-transitory computer-readable storage medium of claim 14, wherein the instructions cause the processing device to perform operations further comprising:

receiving a program command from a first tenant of the plurality of tenants executed by the host system at a first physical function of the plurality of physical functions;

determining a first placement identifier associated with the first physical function; and causing data associated with the program command to be programmed to a first reclaim unit of the memory device, wherein the first reclaim unit is identified by the first placement identifier.

18. The non-transitory computer-readable storage medium of claim 14, wherein the instructions cause the processing device to perform operations further comprising:

periodically reassigning the plurality of placement identifiers among the plurality of physical functions to balance a number of physical functions associated with each of the plurality of placement identifiers.

* * * * *